United States Patent [19]

Shine et al.

[11] Patent Number: 5,524,846

[45] Date of Patent: Jun. 11, 1996

[54] FIRE PROTECTION SYSTEM FOR AIRPLANES

[75] Inventors: Paul R. Shine, Bellevue; Dana L. Young, Issaquah, both of Wash.

[73] Assignee: The Boeing Company, Seattle, Wash.

[21] Appl. No.: 172,472

[22] Filed: Dec. 21, 1993

[51] Int. Cl.6 .................................................. B64D 27/00
[52] U.S. Cl. ...................... 244/53 R; 244/121; 60/39.11; 60/39.32; 277/148
[58] Field of Search ................................. 244/53 R, 1 R, 244/121, 54; 60/200.1, 39.11, 39.091, 39.31, 39.32; 277/148, 152, 189, 192, 193, 227, 235 R

[56] References Cited

U.S. PATENT DOCUMENTS

| | | | |
|---|---|---|---|
| 3,042,364 | 7/1962 | Rowe | 60/39.32 |
| 3,423,070 | 1/1969 | Corrigan | 253/77 |
| 3,656,862 | 4/1972 | Rahaim et al. | 415/171 |
| 3,670,497 | 6/1972 | Sheldon | 60/39.32 |
| 3,729,006 | 12/1973 | Lewis et al. | 60/39.11 |
| 3,934,889 | 1/1976 | Smith | 277/226 |
| 4,230,324 | 10/1980 | Derman | 277/74 |
| 4,566,700 | 1/1986 | Shiembob | 277/53 |
| 4,755,244 | 7/1988 | Allison | 156/158 |
| 4,961,588 | 10/1990 | Brienza | 277/193 |

*Primary Examiner*—Galen L. Barefoot
*Attorney, Agent, or Firm*—Dellett and Walters

[57] ABSTRACT

A system for protecting the strut and wing structure of an airplane from high temperatures proximate the exhaust nozzle end of a jet engine employs a set of outer spring metal fingers attached to the exhaust nozzle outer sleeve and which bear against the strut structure, and a second set of inner spring metal fingers, interleaved with the first, which close off interfinger slots in the first or outer set whereby to maintain firewall integrity. Hot gases are thereby prevented from passing forwardly into the strut structure and wing area so as to protect the same in the event of an engine fire.

15 Claims, 3 Drawing Sheets

FIRE PROTECTION SYSTEM FOR AIRPLANES

BACKGROUND OF THE INVENTION

The present invention relates to a fire protection system for airplanes and particularly to a system for maintaining firewall integrity between the airplane wing strut structure and the jet engine supported thereby.

Jet engines are typically attached to the wing of an airplane by means of nacelle struts or pylons which enclose the pneumatic, electric, fuel and hydraulic connections to the engine as well as links and spars supporting the engine from the airplane wing. Struts are essentially frame and skin structures riveted and bonded together to form a torque box.

The airplane jet engine operates at high temperatures whereby a strut fire seal and firewall are desirably incorporated to protect the wing and upper strut systems from exposure to high temperatures and fire damage. Firewall continuity is desirably maintained with the stainless steel primary exhaust nozzle sleeve of the engine serving as a continuation of a strut firewall.

An engine fire must be contained and must not penetrate the adjacent strut structure. However, the unusual contour of the turbine exhaust nozzle can produce a gap which is uneven in dimension between the nozzle upper forward edge surface and the strut structure lower surfaces. The engine is, of course, very heavy and is subject to relative motion with respect to the airplane structure due to thermal and loading conditions.

Heretofore, various fire barrier means have been employed to avoid penetration of hot gases and flame in the event of an engine fire. In one instance a seal between the engine exhaust nozzle and the strut structure comprised an elastomeric "O-ring" section coated by fiberglass. However, this solution may not provide substantial compensation for varying dimensions. Also reliability and wear resistance may be in question. In another prior art system, a plurality of sheet metal spring fingers secured to the turbine exhaust nozzle structure contacted a seal depressor attached to the strut structure. Slots between fingers enabled the accommodation of some degree of nozzle/strut gap as well as compensation for the unique contours involved. However, the slots or spaces between the fingers could allow penetration of hot gases and flame to the strut area in the event of an engine fire whereby the intended fire barrier purpose is not accomplished.

SUMMARY OF THE INVENTION

It is accordingly an object of the present invention to provide an improved system for protecting the strut and wing structure of an airplane from high temperature exhaust nozzle gases emitted from a jet engine attached below the airplane wing by the strut structure.

It is another object of the present invention to provide an improved fire seal between an airplane strut structure and the jet engine supported therebelow, said fire seal compensating for irregular and complex contours and relative motion between parts due to thermal and loading conditions.

It is a further object of the present invention to provide an improved fire barrier system between an airplane wing strut structure and the jet engine carried thereby which is less subject to penetration of hot gases than prior art systems.

In accordance with an embodiment of the present invention, a system for protecting the strut and wing structure of an airplane from high temperature gases generated at an engine exhaust nozzle comprises first and second sets of metal spring fingers or leaves which are attached to the engine exhaust nozzle outer sleeve and bear against a seal depressor attached to the pylon or strut structure disposed thereabove. Each set of metal fingers suitably comprises segmented portions of a substantially flat sheet metal member having said fingers bent upwardly therefrom toward the strut structure seal depressor. The fingers are separated by slots for enabling the fingers to act independently in regard to contacting the seal depressor and thereby accommodate the seal to various contours and loading conditions. A second of the sets of fingers overlays the first whereby the intermediate slots are substantially closed to the penetration of hot gases and flame from the engine exhaust nozzle exit to the upper strut system and wing. The fingers are shaped to provide spring biasing against the strut seal depressor for maintaining contact between the outer spring fingers and the seal depressor, while the spring fingers of the inner set are disposed in nested relation with the spring fingers of the outer set and are also biased toward the strut structure seal depressor.

As a consequence of the present invention, the seal assembly substantially closes off a passage for hot gases into the strut structure while being adapted to accommodate and seal irregular and complex contours. The fire seal is substantially continuous with the inner and outer nested finger elements, and firewall integrity is maintained.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

DETAILED DESCRIPTION

Figure 1:
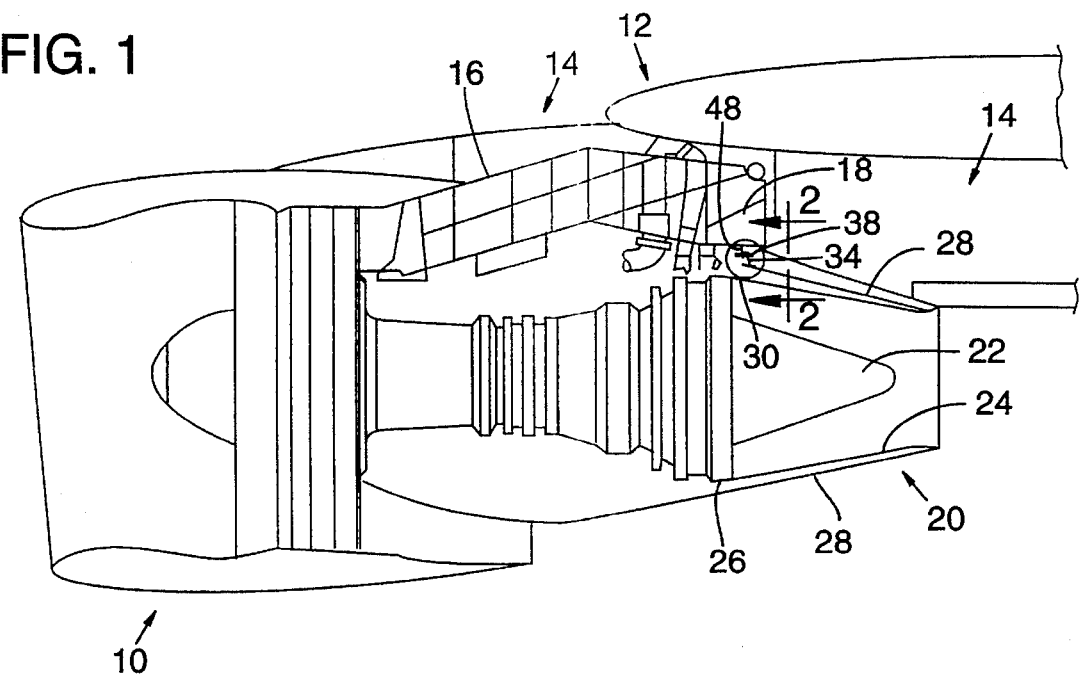
FIG. 1 is a side view, partially broken away and in cross section, of a jet engine as mounted to an airplane wing and including a system for protecting the strut and wing structure.
Figure 2:
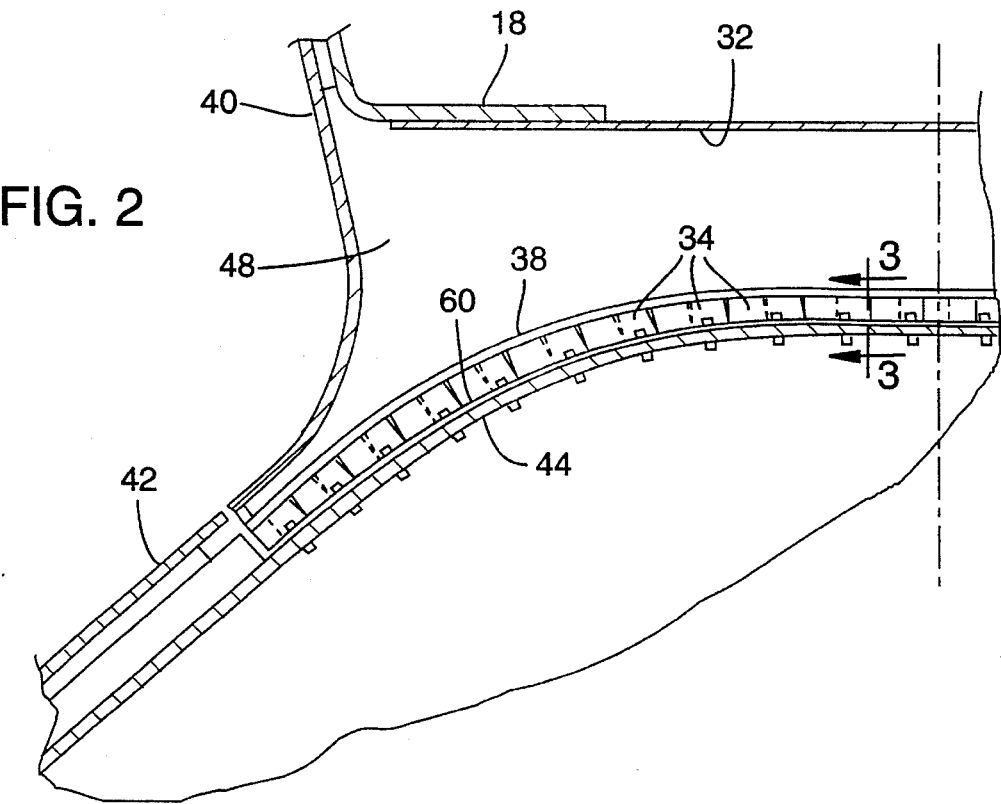
FIG. 2 is a sectional view taken at 2—2 in FIG. 1.

Referring to the drawings and particularly to FIG. 1, turbofan engine 10 is secured to the underside of airplane wing 12 via an intermediate strut structure 14, the latter essentially comprising a frame and skin structure riveted and bonded together to form a torque box. Spars, including upper spar 16 and lower spar 18, are the primary loadcarrying members of the strut and are provided with bulkheads to which the engine 10 is attached. A system of links and braces (not shown) connect the spars to the airplane wing.

The exhaust nozzle 20 of the jet engine includes a central exhaust plug 22 surrounded by inner turbine exhaust sleeve 24 which is attached to engine flange 26 (by means not shown) and the nozzle is further provided with nozzle outer sleeve 28. In region 30 it is desired to provide a seal between strut firewall 32 and the aft end of the engine to prevent hot gases or flame issuing from the engine exhaust nozzle, particularly in the case of an engine fire, from reaching the forward area of the strut structure including spars 16, 18 and wing 12 thereabove. In accordance with the present invention, and as more particularly depicted in FIGS. 2–6, plural sets of spring fingers comprising a set of outer spring fingers 34 and a set of inner spring fingers 36 are provided for engaging seal depressor 38. The spring finger and seal depressor structure extends over a partial circumferential portion of the engine, e.g. over the upper 60° or so of the circumference of the exhaust nozzle outer sleeve to where the same is covered by fairing 40 extending to core cowl 42.

Figure 3:
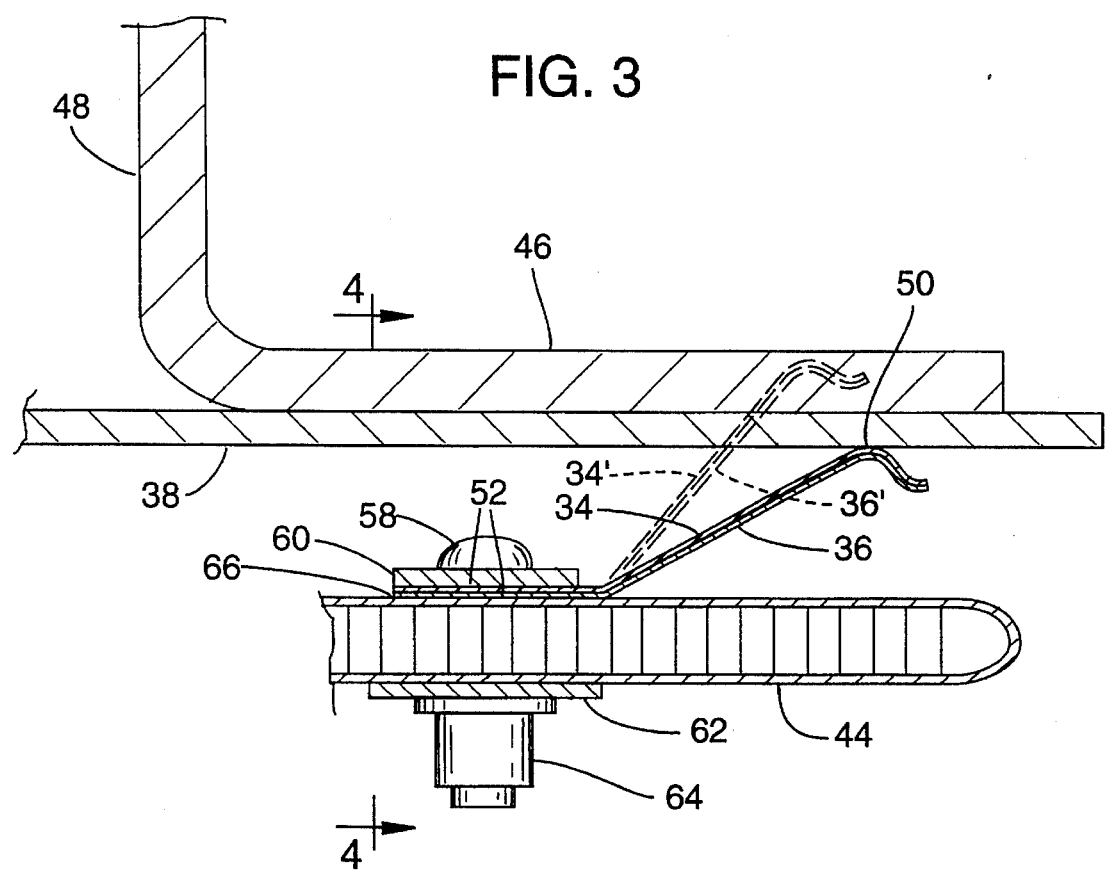
FIG. 3 is a cross sectional view taken at 3—3 in FIG. 2 and illustrating a seal incorporating metal fingers in accordance with the present invention.

Referring particularly to FIG. 3, fingers 34 and 36 are mounted to the forward circumferential segment 44 of the exhaust nozzle outer sleeve 28, i.e., at the inlet end of the exhaust nozzle. The fingers as manufactured are initially shaped so that in the normal or unrestrained condition they extend upwardly in nested relation to one another as illustrated in dashed lines at 34' and 36' in FIG. 3. However, when mounted as shown they are biased with restoring spring tension to firmly contact the lower side of seal depressor 38, the latter being attached to the lower angle 46 of strut firewall bulkhead 48 that extends downwardly from firewall 32 of the strut structure. The forward, outer ends of the fingers are doubly curved as shown to provide an outer radius 50 for smoothly contacting depressor 38.

Figure 4:
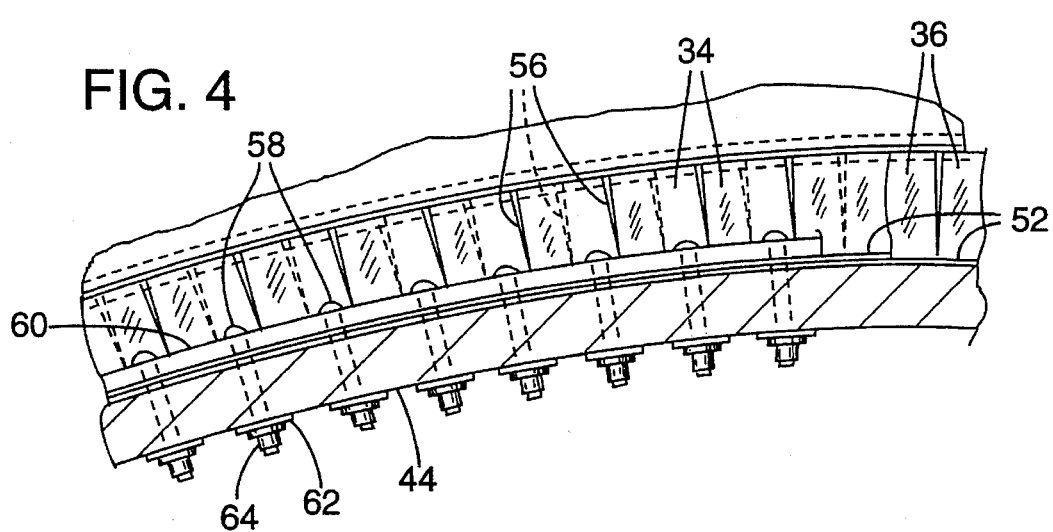
FIG. 4 is a cross sectional view, partially broken away, as taken at 4—4 in FIG. 3 and further illustrating the aforementioned fingers.
Figure 5:
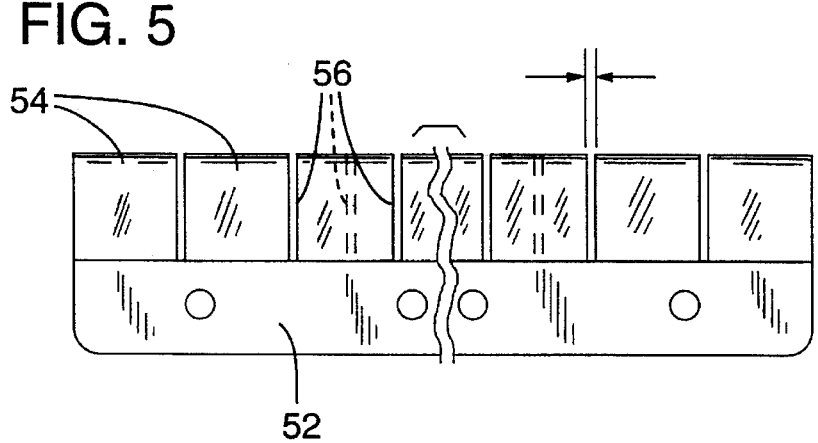
FIG. 5 is a plan view of one set of said of sealing fingers as forming part of a sheet metal member.
Figure 6:
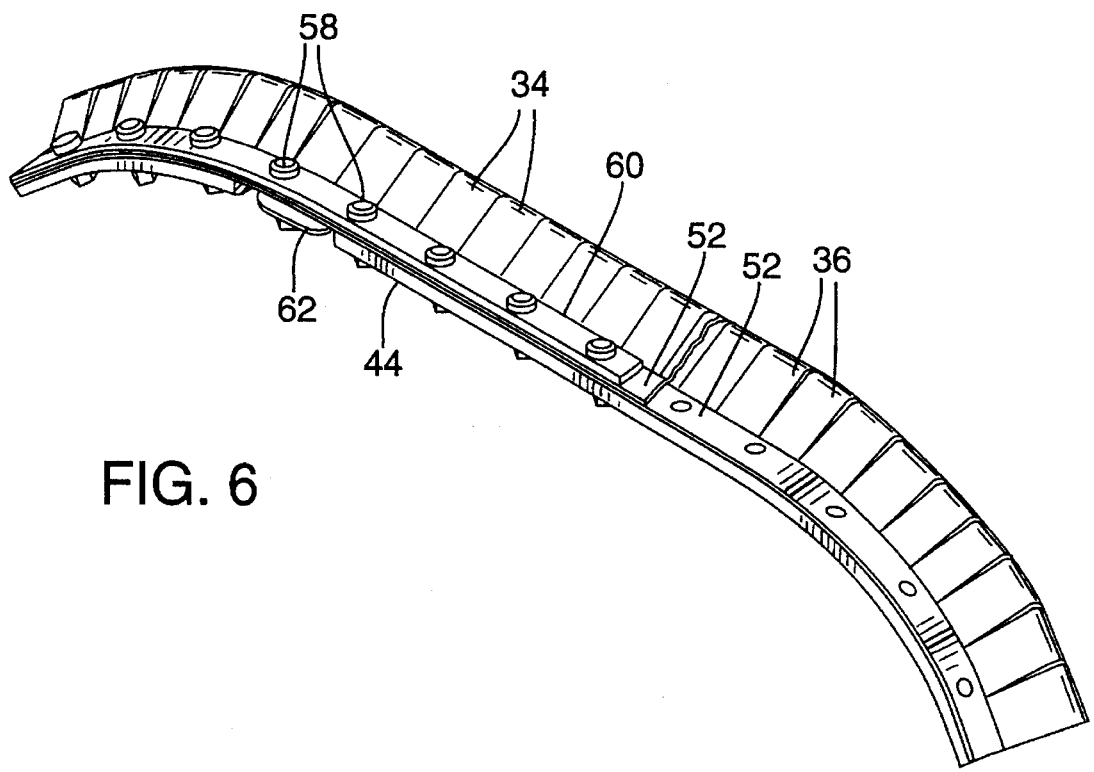
FIG. 6 is an isometric view of the inner and outer metal spring fingers comprising the seal in accordance with the present invention.

Referring to FIGS. 4–6 more specifically, in the array of spring fingers forming the spring seal assembly according to the present invention, the outer set of fingers 34 actually contact depressor 38, while the nested, inner set of fingers 36 located therebelow provide additional spring tension and are biased toward the outer fingers. Referring particularly to FIG. 5, each set of fingers is formed as part of a sheet metal member 52 having finger plates or leaves 54 extending forwardly (and bent upwardly) therefrom. The plates or leaves are provided with spaces or slots 56 therebetween such that the fingers can act independently for providing contact with the depressor thereabove, despite the somewhat complex shape of the exhaust nozzle outer sleeve wherein a variable gap may occur between the exhaust nozzle outer sleeve and the depressor 38. The spaces 56 are located at 0.77 inch intervals in the instance of a specific embodiment.

To prevent the transmission of hot gases through spaces 56, two sets of fingers are installed with the inner finger spaces staggered or offset with respect to the outer finger spaces as best illustrated in FIGS. 4 and 6. In a particular example the spaces between the fingers in both outer and inner sets are spaced at 0.77 inch intervals, but the spaces or slots of inner fingers 36 are offset by half that distance, i.e., 0.385 inches, whereby a slot between fingers of each set is overlaid by the midsection of a finger from the other set. As mentioned, the fingers are also disposed in nested relation as shown. Thus, a continuous barrier is formed while also maintaining the ability of the fingers to compensate for possible changing gap dimensions.

Referring to FIGS. 3, 4 and 6, the rearward or plate 52 portion of the finger sets are welded at rear edges 66 to an overlying retainer 60, the latter comprising a continuous metal strip secured to exhaust nozzle segment 44 by screws 58 that extend through matching holes in segment 44, as well as the continuous plate portions 52 of the finger sets. The retainer 60 is thereby constrained to the shape of the upper circumferential part of the nozzle segment. The screws 58 threadably engage nuts 64 on the inside of the nozzle and are drawn up against plate members 62 contacting the inside of the nozzle segment.

In the specific embodiment, the outer spring seal comprising spring fingers 34 and the inner spring seal comprising fingers 36 were formed of nickel alloy 718 sheet per AMS 5596. The outer side of the outer spring seal for contacting the seal depressor was tungsten carbide sprayed. Seal retainer 60 was also formed from nickel alloy 625 sheet per AMS 5599, while the support assembly comprising elements 58, 62 and 64 was desirably formed from pH 15-7 Mo corrosion resistant steel tre-metal provided by ASTECH/MCI Manufacturing Inc., Santa Ana, Calif. An optional material for the support assembly is again nickel alloy 625 material per AMS per 5599.

As will be seen the sealing system according to the present invention maintains firewall integrity while retaining the ability to fit unusual contours between the upper forward edge of a jet engine exhaust nozzle outer sleeve and the surface of a strut depressor extending downwardly from a pylon or strut structure.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for protecting the strut means and wing structure of an airplane from high temperature gases present proximate the exhaust nozzle means of a jet engine attached to said wing structure by said strut means, said system comprising:

a lateral array of metal fingers disposed between said strut means and nozzle means for closing off the flow of hot gases therebetween, said metal fingers being attached to one of said means while being spring biased toward the other of said means, said array of metal fingers comprising a first set of spaced fingers for making contact with the said other of said means, wherein ones of said first set of spaced fingers are doubly curved to provide an outer radius for smoothly contacting the said other of said means, and a second set of fingers dimensioned and positioned to overlay the spaces between said first set of fingers.

2. The system according to claim 1 wherein said fingers are attached at first ends thereof to said exhaust nozzle means and are spring biased toward said strut means.

3. The system according to claim 2 wherein said strut means includes a downwardly extending seal depressor toward which said fingers are biased.

4. The system according to claim 3 wherein said strut means comprises a firewall bulkhead upon which said seal depressor is mounted.

5. The system according to claim 1 wherein said doubly curved fingers provide an inner radius for smoothly contacting the said one of said means when sufficiently depressed to cause such contact.

6. The system according to claim 1 wherein ones of said second set of fingers are doubly curved.

7. The system according to claim 1 wherein fingers of said first set of spaced fingers comprise a tungsten carbide coating on at least a face thereof.

8. A system for protecting the strut and wing structure of an airplane from high temperature gases proximate the exhaust nozzle end of a jet engine attached below said wing by said strut structure, said strut structure including a lower member, said system comprising:

a plurality of metal fingers extending from the outer sleeve of said exhaust nozzle and biased toward said lower member, said plurality of metal fingers comprising a set of outer fingers in close spaced relation to one another for making contact with said lower member across at least a partial circumferential portion of said engine adjacent said strut structure, said outer fingers defining slots therebetween to provide independent finger flexing, wherein ones of said outer fingers comprise a doubly curved portion to provide an outer radius for smoothly contacting said lower member, and a set of inner fingers in close spaced relation to one another and in nested relation with said outer fingers, said inner fingers also defining slots therebetween to provide independent finger flexing, wherein said inner fingers are laterally offset with respect to said outer fingers for covering the slots between said outer fingers and closing off the region of said exhaust nozzle from the region of said strut structure longitudinally forward thereof on said airplane.

9. The system according to claim 8 wherein said lower member comprises a seal depressor member.

10. The system according to claim 5 wherein said metal fingers comprise substantially flat spring metal means mounted toward the inlet end of said exhaust nozzle and extending forwardly where said fingers are biased outwardly and said outer radius of said ones of said outer fingers contacts said lower member.

11. The system according to claim 10 wherein each set of said metal fingers comprises segmented portions of a substantially flat sheet metal member having said fingers bent upwardly therefrom.

12. The system according to claim 10 including a retainer strip to which said sets of fingers are welded, and fastener means for securing said retainer strip to the upper perimeter of said exhaust nozzle.

13. The system according to claim 8 wherein said doubly curved portion provides an inner radius for smoothly contacting the outer sleeve of said exhaust nozzle when said ones of said outer fingers are depressed so as to cause such contact.

14. The system according to claim 8 wherein ones of said inner fingers are doubly curved.

15. The system according to claim 8 wherein said outer fingers comprise a tungsten carbide coating on at least a face thereof.

* * * * *